July 30, 1963 F. GROSS 3,099,767

DELAY LINE FOR TRAVELING WAVE TUBES

Filed June 1, 1959 5 Sheets-Sheet 1

Inventor:
Franz Gross
By [signature] Atty.

July 30, 1963 F. GROSS 3,099,767

DELAY LINE FOR TRAVELING WAVE TUBES

Filed June 1, 1959 5 Sheets-Sheet 2

Inventor:
Franz Gross.
By [signature] Atty.

DELAY LINE FOR TRAVELING WAVE TUBES

Filed June 1, 1959 5 Sheets-Sheet 3

Inventor.
Franz Gross.
By [signature] Atty.

July 30, 1963 F. GROSS 3,099,767

DELAY LINE FOR TRAVELING WAVE TUBES

Filed June 1, 1959 5 Sheets-Sheet 4

Inventor:
Franz Gross
By [signature] Atty.

Inventor:
Franz Gross.
By [signature] Atty.

United States Patent Office 3,099,767

Patented July 30, 1963

3,099,767
DELAY LINE FOR TRAVELING WAVE TUBES

Franz Gross, Munich, Germany, assignor to Siemens and Halske Aktiengesellschaft, Berlin and Munich, a corporation of Germany Filed June 1, 1959, Ser. No. 817,160
Claims priority, application Germany June 3, 1958
12 Claims. (Cl. 315—3.6)

The invention disclosed herein is concerned with a delay line for a traveling wave tube, consisting of a hollow conductor or wave guide which comprises transverse webs symmetrically disposed on oppositely extending parts of the wall in longitudinal direction at substantially equally spaced intervals and alternately extending into the reciprocal space.

There are delay lines known, for use in generating electric oscillations with a wave length in the order of magnitude from 1 centimeter to 1 meter, consisting of a cross sectionally rectangular hollow wave guide having webs disposed transversely to the direction of travel of the electron bundle. The webs are approximately equally spaced and alternately secured to oppositely extending capacitance surfaces of the rectangular wave guide. The width of the rectangular wave guide greatly exceeds that of the webs.

The dimensions of the above described known structure must be considerably reduced upon transition to millimeter waves. It is accordingly necessary to increase the radiation current density so as to obtain sufficiently high output capacity. It was thereby found that the above described known structure is not directly adapted for use with shortest waves (millimeter waves). The known structure is furthermore usable only for generator operation for short waves.

The problem underlying the invention consisted in view of the above explained situation in respectively improving or reconstructing the known hollow wave guide delay line with transverse webs so as to obtain a thermally stable structure which can withstand the elevated temperatures caused by electron impact as, for example, in helical structures, without incurring warping of the webs and consequently frequency alterations. Moreover, the known delay line was to be modified so that the forwardly propagated first partial wave, which is in case of a rearwardly propagated basic wave brought into reciprocal action with the electron beam, could be used for amplifying purposes.

An important feature of the delay line according to the invention, for use in traveling wave tubes, consisting of a hollow conductor or wave guide, resides in the provision of transverse webs symmetrically arranged therein which are disposed substantially equally spaced on oppositely extending walls and reach in longitudinal direction alternately to the reciprocating space, such webs having a surface extending substantially over the corresponding half of the cross-sectional opening of the wave guide and being at the portions which neighbor on the hollow wave guide conductively connected therewith.

Important advantages of the structure according to the invention reside in the fact that a warping of the transverse webs is due to the stable mounting thereof avoided even with shortest waves, despite the considerable electron impact, and that a great band width and good coupling impedance are at the same time obtained by the shape of the transverse webs despite the utilization of the forwardly propogated first partial wave. Another advantage resides in the use of the transverse webs for focusing the electron beam with magnetic field alternating in discharge direction.

The foregoing and other objects and features of the invention will appear in the course of the description which will be rendered below with reference to the accompanying drawings. In the drawings, FIGS. 1 to 7 illustrate the inventive thoughts in simplified and in part schematic representation;

Figure 12:
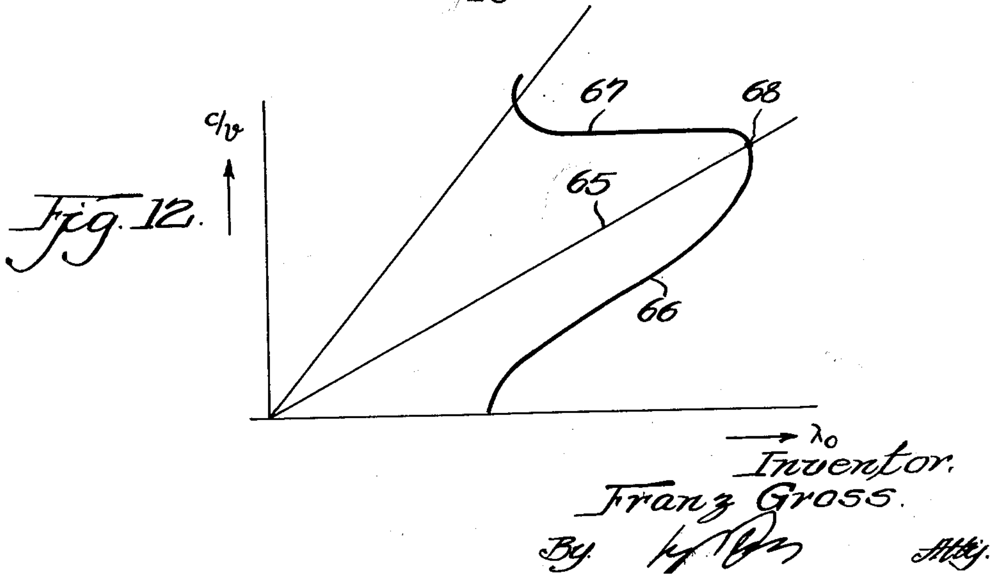
FIG. 12 is an example of a dispersion diagram.

Terms such as $\pi$-resonance, $\pi$-line, partial wave or rearwardly propagated basic wave, are believed to be well known in the field of traveling wave tubes and wave guides. The term $\pi$-resonance means that the phase rotation of the electric field strength per structural length amounts to the angle $\pi$. The dispersion of a delay line is customarily plotted as a function $$\frac{c}{v}=\frac{\lambda_0\psi}{2\pi L}$$

wherein $c$ is the speed of light, $v$ the phase velocity of the wave, L the structural length, $\lambda_0$ the wave length and $\psi$ the phase rotation per structural length. The linear line or curve which results in a coordinate system plotted according to this function with $c/v$ as ordinate and $\lambda_0$ as abscissa for $\psi=\pi$ and is referred to as linear $\pi$-line. For the phase angle of $0<\psi<\pi$ will be obtained the basic wave of the partial waves moving along the line. A condition when the phase velocity of the basic wave is directed in opposite direction of the group velocity, is referred to as rearwardly moving basic wave or return wave. In a basic return wave, the phase velocity decreases with increasing wave length while the phase velocity decreases with decreasing wave length in the case of a forwardly moving base wave. The +1-partial wave is the partial wave the dispersion curve of which extends between the phase angles $\pi$ and $2\pi$. FIG. 12 shows an example of a dispersion diagram to illustrate the above explanations. The linear $\pi$-line is indicated at 65. Numeral 66 indicates the dispersion wave of the basic wave which is assumed to move rearwardly. Numeral 67 indicates the dispersion wave of the +1-partial wave. The $\pi$-resonance lies at point 68.

FIGS. 1 to 6 show a number of thin metal sheets which can be in simple manner assembled superposed or in layers and secured, for example, by gold solder, to produce a delay line. The thin metal sheets can be produced by stamping or by means of an etching method.

FIGS. 1 to 6 show respectively positions $a$, $b$, $c$ in which the individual metal sheets or members are in correct sequence stacked until the delay line of desired length is obtained.

Figures 1, 1A, 2, 3, 4:
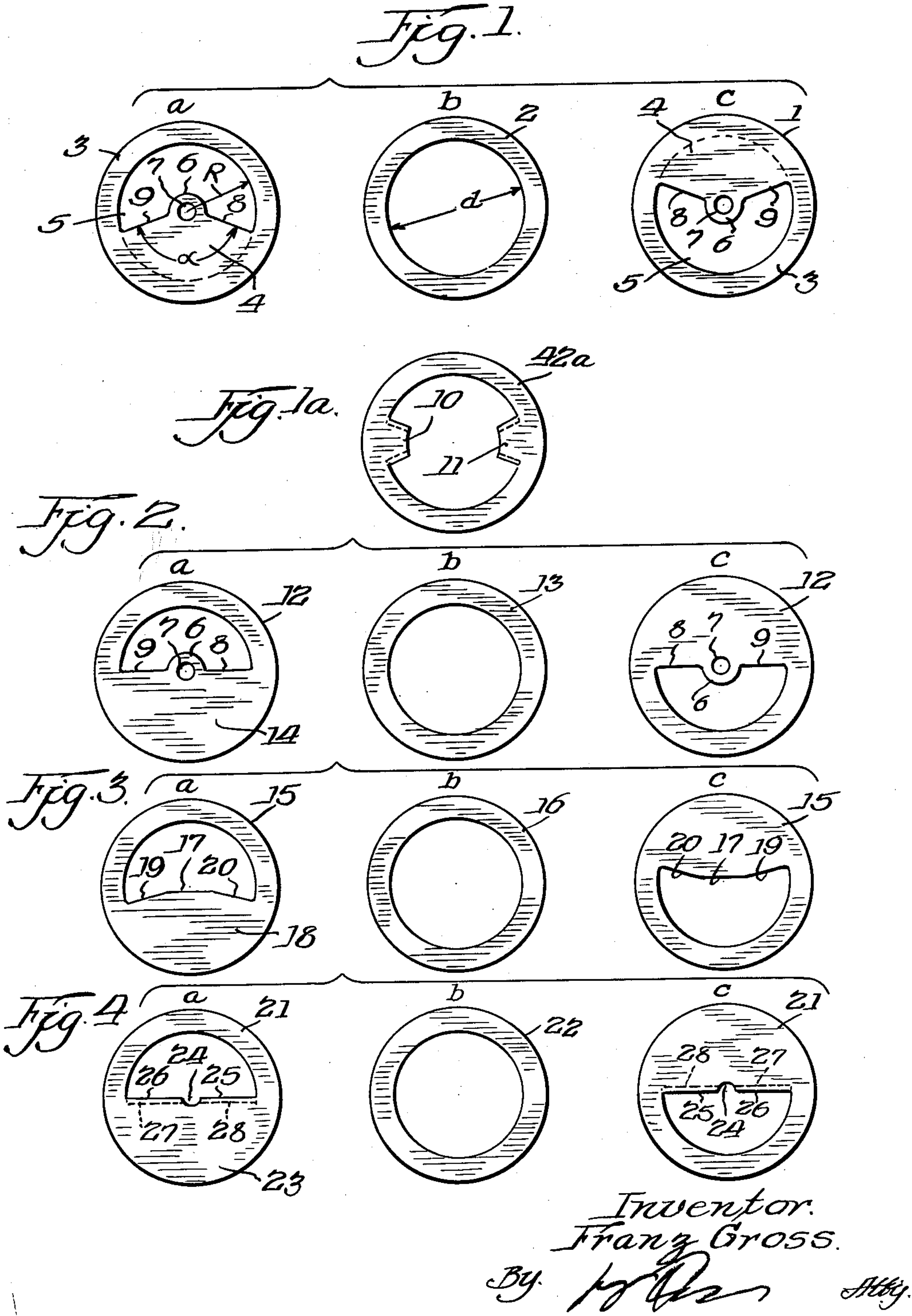

FIG. 1 shows the sheets 1 and 2 of the kind of sheets to be stacked. The term "kind of sheets" is intended to mean all sheets of similar shape and similar size which are produced, for example, with one and the same stamping tool. The sheet 2 merely represents the cross-section of the hollow wave guide, having the inner diameter $d$. The sheet 1 represents the wave guide cross-section 3 and also the transverse webs 4. The transverse webs 4 have in the neighborhood of the reciprocal action range arcuate extensions 6 with openings 7 for the electron beam. Such extensions and openings must be disposed in alignment in the electron beam direction. The radius R of the opening 5 is half of the diameter $d$ of the sheet 2. Upon alteration of the diameter $d$, with constant radius R, the dispersion curve is shifted or displaced approximately parallel to itself in the direction of the axis for the wave length of the corresponding electromagnetic wave in vacuum. This feature makes it for example possible, to place the dispersion curve in simple manner in the desired frequency range.

The edges 8 and 9 of the transverse webs 4, directed into the hollow wave guide or into the opening 5, form an angle which is somewhat smaller than 180°. The sheet 1 is shown again in position $c$ but rotated by 180° relative to the position $a$.

Figure 7:
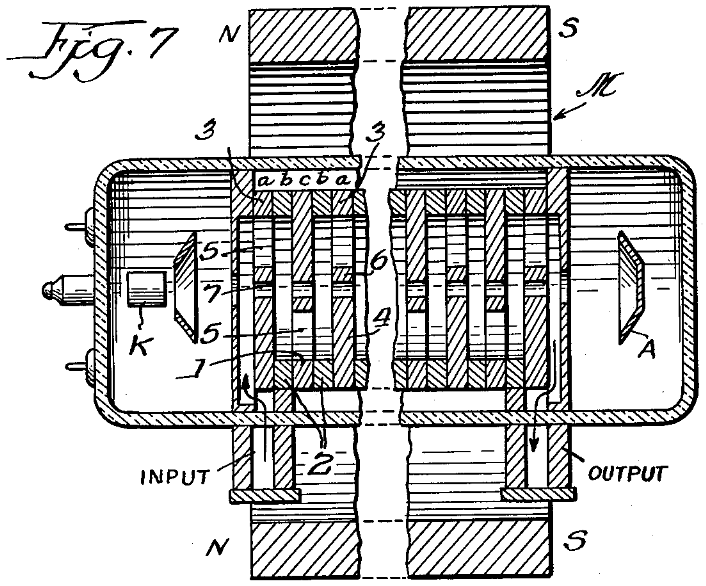

The sheets shown in positions $a$, $b$, $c$ are stacked as illustrated in FIG. 7, representing a longitudinal section through the stacked delay line with the sheets 1 and 2 of FIG. 1, and wherein the cathode is indicated by the reference letter K, and the collector by the letter A. The magnet M is, in this case, in the form of a tube concentric with the axis of the delay line and polarized axially whereby one end is the north pole and the opposite end the south pole.

Delay lines formed of the remaining kinds of types of metal sheets according to FIGS. 2 to 6 are similarly constructed or stacked as shown in FIG. 7.

The sheet 42$a$ shown in FIG. 1$a$ in the position $b$ is provided with two extensions 10 and 11. It may be used in place of the sheet 2 when the dispersion curve of the delay line is to be changed so that, in case of a rearwardly propagated basic wave, the dispersion of the first forwardly propagated partial wave is very small over a very great frequency range and neither the basic wave nor the rearwardly propagated first partial wave can enter into reciprocal action with the electron beam. The requirement is, however, that the extensions 10 and 11 do not touch the edges 8 and 9. The size of the extensions 10 and 11 required for this action is indicated in dotted lines. If the extensions 10 and 11 touch the edges 8 and 9, the dispersion curve will be influenced in the same manner as described for the dimensioning of the radius R and the diameter $d$.

FIG. 2 shows metallic sheets or plates 12 and 13 forming again the diameter of the hollow conductor or wave guide. The sheet 12 differs from the sheet 1 merely in the edges 8 and 9 of the transverse web which form an angle of exactly 180°.

The sheets 15 and 16 shown in FIG. 3 can be used for producing an arrangement similar to FIG. 7 with the difference that a flat beam is advantageously used instead of a circular beam, such beam passing over the flat portion 17 of the transverse web 18. The edges 19 and 20 form again an angle smaller than 180°.

Figure 14:
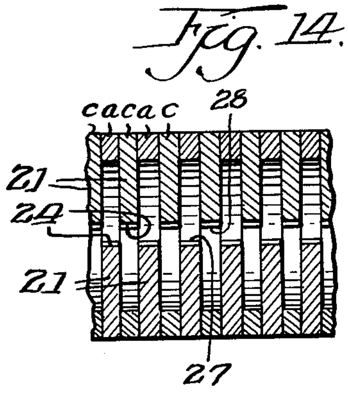
FIG. 14 illustrates a delay line formed from only a single type of member.

FIG. 4 shows the positions $a$, $b$, $c$ of sheets 21 and 22. The sheets 22 of one kind again form the cross section of the hollow wave guide. The sheets 21 have a transverse web 23 provided with a recess 24 formed therin for a circular beam and having edges 25 and 26 disposed at an angle of 180°. The transverse web 23 may however be defined by lower edges 27, 28 which are indicated in the positions $a$ and $c$ in dash lines. This feature permits elimination of sheet 22, requiring merely sequentially proper disposal of the sheets 21 in the positions $a$, $c$, $a$, $c$, etc., as illustrated in FIG. 14. This arrangement is adapted for the amplification of shortest waves without reducing the thermal stability of the delay line.

Figure 5:
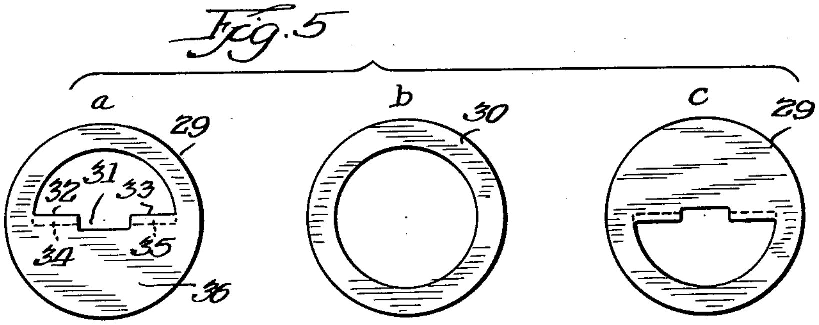

FIG. 5 shows in similar manner as FIG. 4 a sheet 29 with a transverse web 36 and having a recess 31. The recess is in this case rectangular so as to permit the use of a flat beam. The edges of the transverse webs 36 may lie deeper, as indicated in dotted lines 34 and 35, again providing the advantage to use the structure for highest frequencies by omitting the ring 30.

Figure 6:
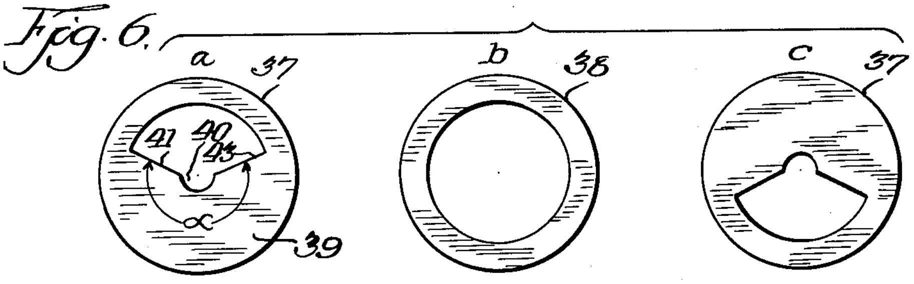

FIG. 6 shows a sheet in which the angle $\alpha$ has been increased resulting in decrease of dispersion of the forwardly propagated first partial wave, thus producing a range which is favorable for amplification purposes. The sheet 37 has a transverse web 39 for a circular beam. The edges 41 and 43 form an angle which is greater than the angle $\alpha$ in FIG. 1, that is, greater than 180° and up to about 200°. The omission of sheets such as 22 and 30, explained in connection with FIGS. 3, 4 and 5, is in the stacking of the sheets according to FIG. 6 impossible; that is, sheets 37, 38, 37 must be stacked in positions $a$, $b$, $c$ as indicated.

Delay lines that may be made with the metal sheets or members shown in FIGS. 1 to 6 have the further advantage that the dispersion curves of such delay lines extend in the dispersion diagram over a great frequency range in the neighborhood of the $\pi$-line. The phase rotation therefore deviates only slightly from the $\pi$ value. The electric field stands substantially between the points neighboring on the reciprocal space and the edges of the openings such as 7, 17, 24, 31 or 40 of the successive webs. So long as the dispersion curve extends in the neighborhood of the $\pi$-line, only a weak field will be between the sheets which are disposed in identical sense, since the web sheets have approximately the same potential. The web surfaces 4, 14, 18, 23, 36 or 39 which are larger as compared with known web surfaces are not electrically disturbing and contribute greatly to the mechanical and thermal stability of the structure. The electrical coupling to the respectively second webs is accordingly inhibited by the web surfaces. However, at the $\pi$-resonance, there is effected a strong through-coupling by way of the slots which remain free (see FIGS. 1 and 3). The magnetic through-coupling compels the occurrence of the rearwardly propagated wave. The influence currents flow thereby practically only along the edges 8 and 9, 19 and 20, etc. of the webs, 4, 14, 18, 23, 36 and 39.

The dispersion curve of the delay line can be varied by the angle $\alpha$. With fixed angle $\alpha$, the pass range can be greatly influenced by the selection of the opening diameter of the wave guide (see FIG. 1$a$). With $\alpha \geqq 180°$, there will result favorable amplifier structures for the operation with forwardly propagated first partial waves, the excitation of rearward or return waves being prevented by the shape of the dispersion curve.

Figure 13:
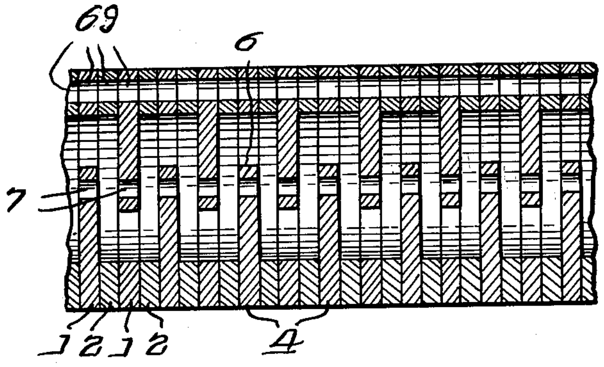
FIG. 13 illustrates a wave guide formed in the wall of the delay line.

It is in many cases of advantage to provide within the wall of the delay line a hollow conductor or wave guide for the coupling of the electromagnetic wave to the delay line or decoupling such wave therefrom. Care must thereby be exercized to dispose the hollow conductor outside the range of action of the delay line. A coupling or decoupling hollow conductor can be provided in most simple manner in the outer wall of the delay line, by means of the sheet members according to FIGS. 1–7, by making these members larger and providing auxiliary openings 69 therein which are placed in alignment upon stacking the members in the positions $a$, $b$ and $c$, as shown in FIG. 13.

It is moreover possible to employ the webs forming the delay line, especially those shown in FIGS. 1, 2 and 7, in simple manner for guiding bundled or focused electron beams. The webs of the sheet members are of advantage especially when using a magnetic field which alternates spatially and periodically in the electron beam propagating direction.

As is known, the electron beam can be guided not only by means of magnetic fields which are homogeneous in the direction of discharge; but a magnetic field alternating spatially in the direction of the electron beam, that is, a field which periodically changes the direction of the lines of force in the direction of the electron beam, is particularly advantageous for guiding strongly densified electron beams as they must be employed in traveling wave tubes for millimeter waves.

Figure 10:
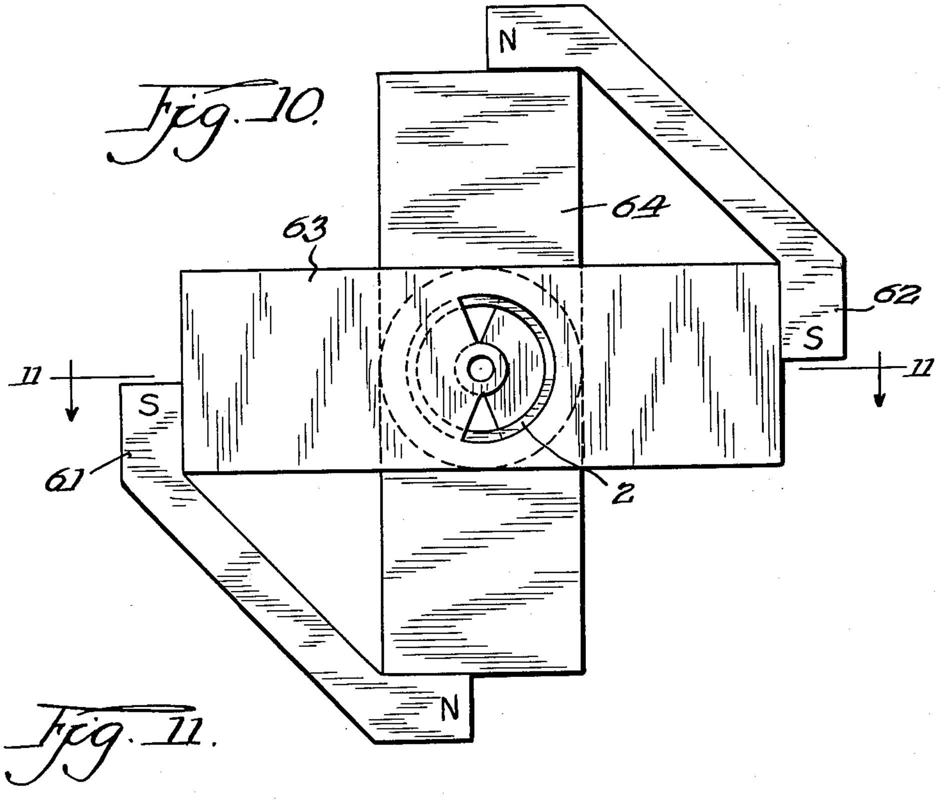
FIG. 10 shows a delay line according to the invention, as seen from the front or end thereof.
Figure 11:
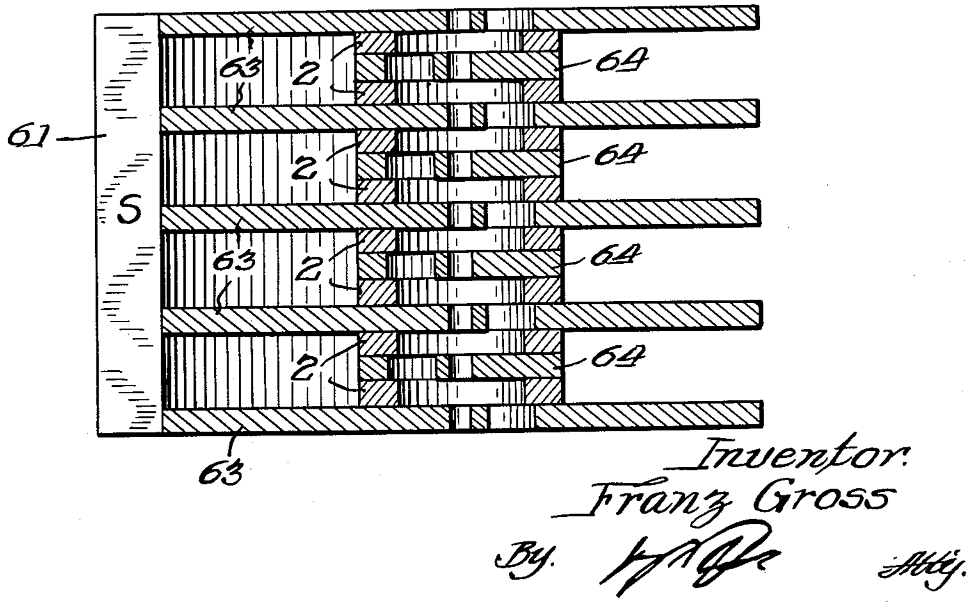
FIG. 11 is a sectional view of the delay line illustrated in FIG. 10, taken approximately on the line 11—11 thereof.

When using two types of metallic sheet members for the construction of the delay line, only the transverse webs and the parts of one sheet type neighboring on the transverse webs and forming the line cross section, must for the generation of an alternating magnetic field consist of magnetically soft material. All other parts of the delay line must be made of non-magnetic material. For producing the alternating magnetic field, there are provided, as illustrated in FIGS. 10 and 11, two magnets 61 and 62 which are disposed outside of the delay line opposite each other and extend symmetrically in parallel to the system axis. These magnets extend longitudinally over the entire length of the delay line. They are, however, magnetized in a direction radial of the delay line. The webs and neighboring parts which are made of magnetically soft material and have, as seen in discharge direction, odd order numbers are connected with the magnetic south poles of the magnets by means of rectangular metal strips 63, and the webs having even order numbers are as seen in discharge direction, connected with the magnetic north poles of the magnets by rectangular metal strips 64. The metallic strips, 63, 64, have apertures formed therein by stamping, the configuration of which corresponds to that of the apertures in the sheet members, and between the members 63 and 64 are disposed non-magnetic members 2 forming the wave guide cross section of the delay line. The direction of magnetization of one of the magnets must for this purpose be radially away from the delay line and that of the other magnet must be radially toward the delay line.

Figure 8:
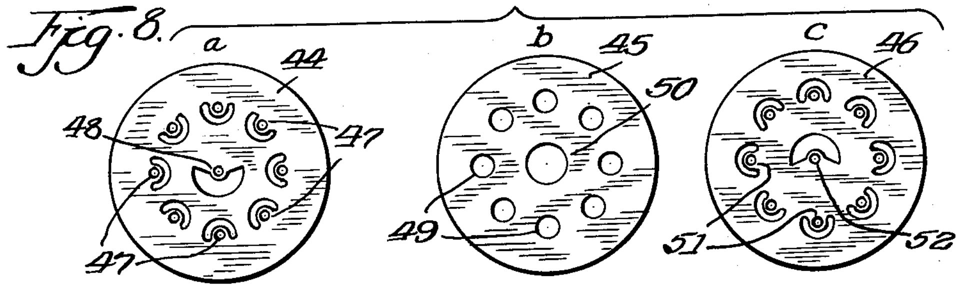
FIG. 8 shows a modified configuration of the parts for assembling delay line combinations for plural system tubes.

The respective sheet members or types for the production of delay lines according to the invention may be varied so as to produce upon stacking delay line combinations for plural system tubes. It is thus possible, as shown, for example, in FIG. 8, to form a delay line centrally, that is, centrally of the disks 44, 45, 46, and to provide about the centrally positioned delay line further delay lines which extend mutually in parallel and symmetrically to the system axis. As will be seen from FIG. 8, the sheet 44 is provided with webs 47 and a central web 48. The webs 47 and 48 conform substantially to FIG. 1 but may also have the form and properties of the webs according to FIGS. 2 to 6. The sheet member 45 which is, similarly to the sheets 2, 13, 16, 22, 30, 38 in FIGS. 1 to 6, the spacing member, has outer holes 49 and a central hole 50 punched therein. The sheet member 46, shown in the position *c*, contrary to similarly positioned sheet members according to FIGS. 1 to 7, must be separately produced, since the radially outwardly directed webs 51 cannot be formed by rotation of the first noted kind of sheet members. The central web member 52 is angularly displaced by 180° with respect to the web 48. The sheet members 44 to 46 of FIG. 8 are stacked in positions *a*, *b*, *c* until the delay line formed thereby has the desired length. The assembled stack of sheet members 44 to 46 forms a structural unit which is of advantage in connection with plural discharge system tubes.

For the operation as oscillator-amplifier tube, the delay line lying centrally of the entire discharge system of the plural discharge system tube may be formed as delay line for very short waves, especially millimeter waves, and the associated electron beam producing system may produce a radiation current and electron velocity such that rearward or return wave oscillator operation will result. The second discharge system with the delay lines disposed symmetrically about the longitudinal axis is constructed and operated so as to provide for amplifier and/or limiter action.

For the deflection of the electromagnetic wave produced in the centrally disposed discharge system, into the outwardly disposed amplifier system, there is on the cathode side suitably provided a symmetrizing device which is constructed cone-shaped with its tip directed toward the central system and having circumferentially extensions of the grooves of the symmetrically outwardly arranged delay lines, the depth of such grooves decreasing in the direction of the cone tip.

Figure 9:
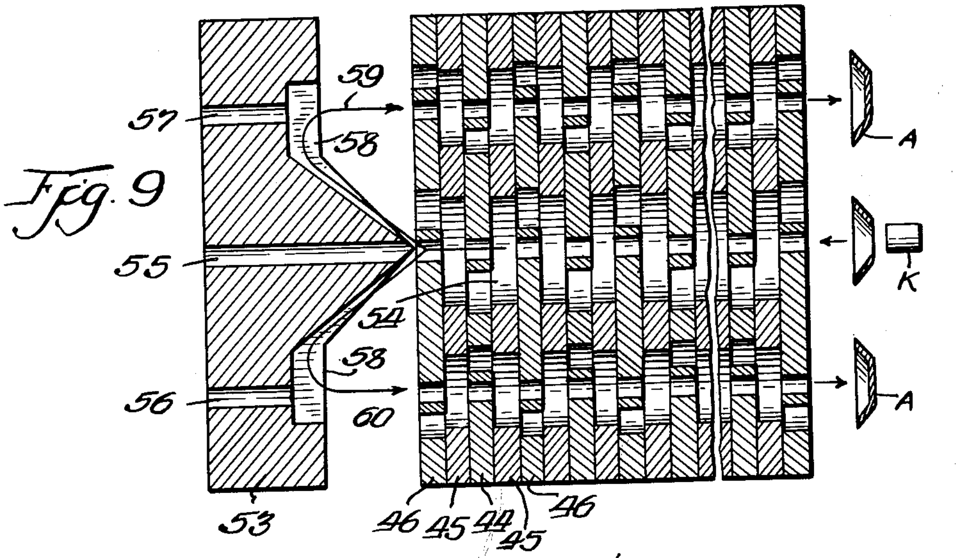
FIG. 9 illustrates the use of a symmetrizing device.

Referring to FIG. 9, numeral 53 indicates the cone shaped symmetrizing device the apex of which is directed to the centrally disposed system 54 having a cathode K and a collector A. The bores 55, 56, 57 serve for guiding the electron beams for the individual delay lines. The cone shaped member 53 is provided with grooves 58 formed therein, the depth of which decreases in the direction of the apex. These grooves effect directing the electromagnetic wave, produced in the central system 54 due to return wave action, into the delay lines which are symmetrically positioned about the system 54 (see also FIG. 8 (*a*–*b*–*c*). The spreading of the electromagnetic wave is indicated by arrows 59 and 60.

An electron beam is suitably employed for the operation of the amplifier system, which is controlled so that individual beam sectors enter into reciprocal action with the electromagnetic waves of the outwardly disposed delay lines which are symmetrically arranged about the system axis.

Changes may be made within the scope and spirit of the appended claims which define what is believed to be new and desired to have protected by Letters Patent.

I claim:

1. A delay line for a traveling wave tube having a wave guide of circular cross sectional configuration, comprising a plurality of transverse webs extending, as viewed in longitudinal direction, alternately to opposite wall portions into the reciprocal space between a wave on the line and an electron beam permeating the delay line and being substantially equally spaced apart, said transverse webs passing electrically conductively into the wave guide wall and respectively occupying an area corresponding substantially to one-half of the aperture cross section of the wave guide, said delay line comprising two types of sheet members, one type forming the cross section of the hollow conductor and the other type forming the cross section and the web, said members being alternately assembled in a stack and secured in position, the members of the second named type being disposed to alternately angularly displace said transverse webs by 180°, at least one of said types of members being made of non-magnetic material.

2. A delay line for a traveling wave tube having a wave guide of circular cross sectional configuration, comprising a plurality of transverse webs extending, as viewed in longitudinal direction, alternately to opposite wall portions into the reciprocal space between a wave on the line and an electron beam permeating the delay line and being substantially equally spaced apart, said transverse webs passing electrically conductively into the wave guide wall and respectively occupying an area corresponding substantially to one-half of the aperture cross section of the wave guide, said delay line comprising two types of sheet members, one type forming the cross section of the hollow conductor and the other type forming the cross section and the web, said members being alternately assembled in a stack and secured in position, the members of the second named type disposed to alternately angularly displace said transverse webs by 180°, said webs and the parts of one of said members bordering on the respective webs and forming the cross section of said hollow conductor being made of magnetically soft material while all remaining parts of the delay line are made of non-magnetic material.

3. A delay line according to claim 2, wherein the magnetic parts of said sheet members are alternately magnetically connected with two magnets disposed in parallel with the system axis of the delay line symmetrically and oppositely one another and being magnetized in radial direction, odd numbered webs being in discharge direction connected with a magnetic south pole and even numbered webs being in discharge direction connected with a magnetic north pole.

4. A delay line for a traveling wave tube having a wave guide of circular cross sectional configuration comprising a plurality of transverse webs extending, as viewed in longitudinal direction, alternately to opposite wall portions into the reciprocal space between a wave on the line and an electron beam permeating the delay line and being substantially equally spaced apart, said tranverse webs passing electrically conductively into the wave guide wall and respectively occupying an area corresponding substantially to one-half of the aperture cross section of the wave guide, said delay line comprising two types of members, one type forming the cross section of the hollow conductor and the other type forming the cross section and the web, said members being alternately assembled in a stack and secured in position, the members of the second named type being disposed to alternately angularly displace said tranverse webs by 180°.

5. A delay line system having a plurality of delay lines as defined in claim 4, said delay lines being disposed mutually in parallel and symmetrically about the system axis.

6. A delay line system according to claim 5, wherein a wave guide for coupling purposes is disposed with its longitudinal axis coinciding with the system axis.

7. A delay line system according to claim 5, comprising a further centrally disposed discharged system.

8. A delay line system according to claim 7, comprising in combination with the centrally disposed delay line which is provided for very short waves, means for effecting a return wave oscillation, the delay lines disposed symmetrically about the system axis being constructed and actuated for amplifier operation.

9. A delay line system according to claim 7, comprising in combination with the centrally disposed delay line which is provided for very short waves, means for effecting a return wave oscillation, the delay lines disposed symmetrically about the system axis being constructed and actuated for limiter operation.

10. A delay line for a traveling wave tube having a wave guide of circular sectional configuration comprising a plurality of tranverse webs extending, as viewed in longitudinal direction, alternately to opposite wall portions into the reciprocal space between a wave on the line and an electron beam permeating the delay line and being substantially equally spaced apart, said transverse webs passing electrically conductively into the wave guide wall and respectively occupying an area corresponding substantially to one-half of the aperture cross section of the wave guide, said delay line comprising two types of members, one type forming the cross section of the hollow conductor and the other type forming the cross section and the web, said members being alternately assembled in a stack and secured in position, the members of the second named type being disposed to alternately angularly displace said transverse webs by 180° and made of magnetic material, said transverse webs being provided with arcuately shaped extensions, each lying in the plane of the associated web and disposed in the neighborhood of the reciprocal space, the extensions having openings formed therein which are in alignment in the direction of the electron beam.

11. A delay line for a traveling wave tube having a wave guide of circular cross sectional configuration comprising a plurality of transverse webs extending, as viewed in longitudinal direction, alternately to opposite wall portions into the reciprocal space between a wave on the line and an electron beam permeating the delay line and being substantially equally spaced apart, said transverse webs passing electrically conductively into the wave guide wall and respectively occupying an area corresponding substantially to one-half of the aperture cross section of the wave guide, said delay line comprising two types of members, one type forming the cross section of the hollow conductor and the other type forming the cross section and the web, said members being alternately assembled in a stack and secured in position, the members of the second named type being disposed to alternately angularly displace said tranverse webs by 180° and made of magnetic material, said transverse webs being near the range of the reciprocal space provided with recesses formed therein, such recesses being successively aligned in the direction of the electron beam.

12. A delay line for a traveling wave tube having a wave guide of circular cross sectional configuration comprising a plurality of transverse webs extending, as viewed in longitudinal direction, alternately to opposite wall portions into the reciprocal space between a wave on the line and an electron beam permeating the delay line and being substantially spaced apart, said tranverse webs passing electrically conductively into the wave guide wall and respectively occupying an area corresponding substantially to one-half of the aperture cross section of the wave guide, said delay line comprising two types of members, one type forming the cross section of the hollow conductor and the other type forming the cross section and the web, said members being alternately assembled in a stack and secured in position, the members of the second named type being disposed to alternately angularly displace said transverse webs by 180° and made of magnetic material, said members having holes formed therein adjacent their peripheral edges and being assembled in a stack with said holes in alignment.

References Cited in the file of this patent

UNITED STATES PATENTS

| | | |
|---|---|---|
| 2,637,001 | Pierce | Apr. 28, 1953 |
| 2,653,270 | Kompfner | Sept. 22, 1953 |
| 2,744,242 | Cohn | May 1, 1956 |
| 2,806,973 | McEwan et al. | Sept. 17, 1957 |
| 2,842,705 | Chodorow | July 8, 1958 |
| 2,843,797 | Boyd | July 15, 1958 |
| 2,844,754 | Cioffi | July 22, 1958 |
| 2,871,451 | Ashkin et al. | Jan. 27, 1959 |
| 2,872,650 | Winkler | Feb. 3, 1959 |
| 2,895,071 | Kompfner | July 14, 1959 |
| 2,925,520 | Cutler et al. | Feb. 16, 1960 |
| 3,022,123 | Peter | Sept. 26, 1961 |

OTHER REFERENCES

"Propagation Characteristics of Slow-Wave Structures Derived From Coupled Resonators," by Erwin Belohoubek, reprinted from RCA Review, June 1958, vol. XIX, No. 2 publication No. St–1424, pages 283–310.